US009875033B2

(12) United States Patent
Perez et al.

(10) Patent No.: US 9,875,033 B2
(45) Date of Patent: Jan. 23, 2018

(54) APPARATUS AND METHOD FOR MINIMIZING DATA STORAGE MEDIA FRAGMENTATION

(75) Inventors: Miguel Angel Perez, Vail, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1380 days.

(21) Appl. No.: 12/464,748

(22) Filed: May 12, 2009

(65) Prior Publication Data

US 2010/0293354 A1    Nov. 18, 2010

(51) Int. Cl.
*G06F 12/00* (2006.01)
*G06F 3/06* (2006.01)
*G06F 17/30* (2006.01)

(52) U.S. Cl.
CPC .......... *G06F 3/061* (2013.01); *G06F 3/0643* (2013.01); *G06F 3/0689* (2013.01); *G06F 17/30135* (2013.01)

(58) Field of Classification Search
CPC ....... G06F 3/061; G06F 3/0643; G06F 3/0689
USPC ................................................. 711/171, 173
See application file for complete search history.

(56) References Cited

U.S. PATENT DOCUMENTS

| 5,790,886 | A | 8/1998 | Allen |
| 5,987,479 | A | 11/1999 | Oliver |
| 6,487,569 | B1* | 11/2002 | Lui et al. ............... 715/230 |
| 6,496,913 | B1 | 12/2002 | Taugher et al. |
| 7,246,105 | B2 | 7/2007 | Numanoi et al. |
| 2002/0116573 | A1* | 8/2002 | Gold ................. G06F 11/1448 711/111 |
| 2004/0252605 | A1 | 12/2004 | Yoshida et al. |
| 2005/0165856 | A1* | 7/2005 | Fellenstein ........... G06F 3/0613 |
| 2005/0228963 | A1* | 10/2005 | Rothman et al. ............. 711/170 |
| 2006/0095707 | A1* | 5/2006 | Hu .............................. 711/171 |
| 2007/0271349 | A1 | 11/2007 | Clemo et al. |
| 2009/0094433 | A1* | 4/2009 | Thomas et al. ............... 711/172 |
| 2012/0042146 | A1* | 2/2012 | Gandhi ................. G06F 3/0611 711/165 |

OTHER PUBLICATIONS

IEEE 100, The Authoritative Dictionary of IEEE Standards Terms, Seventh Edition, 2000, The Institute of Electrical and Electronics Engineering, Inc., p. 1113.*
IEEE 10, the Authoritative Dictionary of IEEE Standards Terms, 7th ed, 2000, p. 1113.*
DA8920862 PubNo=349 Graphical Disk Drive Fragmentation Control.

* cited by examiner

*Primary Examiner* — Gurtej Bansal
(74) *Attorney, Agent, or Firm* — Yakov Sidorin; Quarles & Brady LLP

(57) ABSTRACT

A method of minimizing data storage medium fragmentation, wherein the method provides a data storage library comprising (N) data storage media, wherein (N) is greater than or equal to 1. The method establishes a threshold fragmentation index, and determines, for each value of (i), an actual fragmentation index for an (i)th data storage medium, wherein (i) is greater than or equal to 1 and less than or equal to (N). The method receives a data set from a host computer in communication with the data storage library, and writes the data set to an (i)th data storage medium based upon an (i)th actual fragmentation index.

20 Claims, 5 Drawing Sheets

APPARATUS AND METHOD FOR MINIMIZING DATA STORAGE MEDIA FRAGMENTATION

FIELD OF THE INVENTION

The present invention relates generally to an apparatus and method for minimizing data storage media fragmentation.

BACKGROUND OF THE INVENTION

Repeated writing data sets to, and erasing data sets from, a data storage medium sizes causes storage space to be used inefficiently. Called fragmentation, this phenomenon reduces storage capacity, and increases access and read times. Fragmentation occurs when a computing device does not allocate enough contiguous storage space to encode a complete data set as a single sequence, and instead divides the data set into portions which are encoded in gaps between other data sets. Typically, these data storage medium gaps arise because an earlier data set was deleted, or excess space was allocated to another stored data set. The degree to which a data storage medium is fragmented heavily dependent upon the size and number of data sets stored on it To combat fragmentation, data storage media are regularly defragmented. via a Defragmentation comprises a process that rearranges datasets written to a data storage medium such that segments of each data set are encoded contiguously. Many different defragmentation tools are available, and although those programs can significantly reduce fragmentation, such defragmentation algorithms are time consuming, memory intensive operations that can significantly reduce the performance of a computer system while being executed. Additionally the process cannot be performed on a data storage medium with no free space.

SUMMARY OF THE INVENTION

There exists a need for a method which both stores data in the most efficient manner and reduces the frequency at which a data storage medium needs to be defragmented. In one implementation, a method of minimizing fragmentation of a data storage medium disposed in a data storage device is presented. The method provides a data storage library comprising (N) data storage media, wherein (N) is greater than or equal to 1.

The method establishes a threshold fragmentation index, and determines, for each value of (i), an actual fragmentation index for an (i)th data storage medium, wherein (i) is greater than or equal to 1 and less than or equal to (N).

The method receives a data set from a host computer in communication with the data storage library, and writes the data set to an (i)th data storage medium based upon an (i)th actual fragmentation index.

In another implementation, an article of manufacture is presented. In certain embodiments, the article of manufacture comprises a storage controller in communication with (N) data storage media. In other embodiments, the article of manufacture comprises a data storage system comprising (N) data storage media.

The article of manufacture includes a computer readable medium having computer readable program code disposed therein to minimize fragmentation of a data storage medium disposed in a data storage device. The computer readable program code includes a series of computer readable program steps to effect retrieving a threshold fragmentation index, and determining, for each value of (i), an actual fragmentation index for an (i)th data storage medium, wherein (i) is greater than or equal to 1 and less than or equal to (N). The computer readable program code further includes a series of computer readable program steps to effect receiving a data set from a host computer in communication with said data storage library, and writing the data set to an (i)th data storage medium based upon an (i)th actual fragmentation index.

In yet another implementation, a computer program product is presented. The computer program product is encoded in a computer readable medium and useable with a programmable computer processor to minimize fragmentation of a data storage medium disposed in a data storage device. The computer program product includes computer readable program code which causes the programmable processor to retrieve a threshold fragmentation index, and determine, for each value of (i), an actual fragmentation index for an (i)th data storage medium, wherein (i) is greater than or equal to 1 and less than or equal to (N). The computer program product further includes computer readable program code which causes the programmable processor to receive a data set from a host computer in communication with said data storage library, and write the data set to an (i)th data storage medium based upon an (i)th actual fragmentation index.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow charts included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
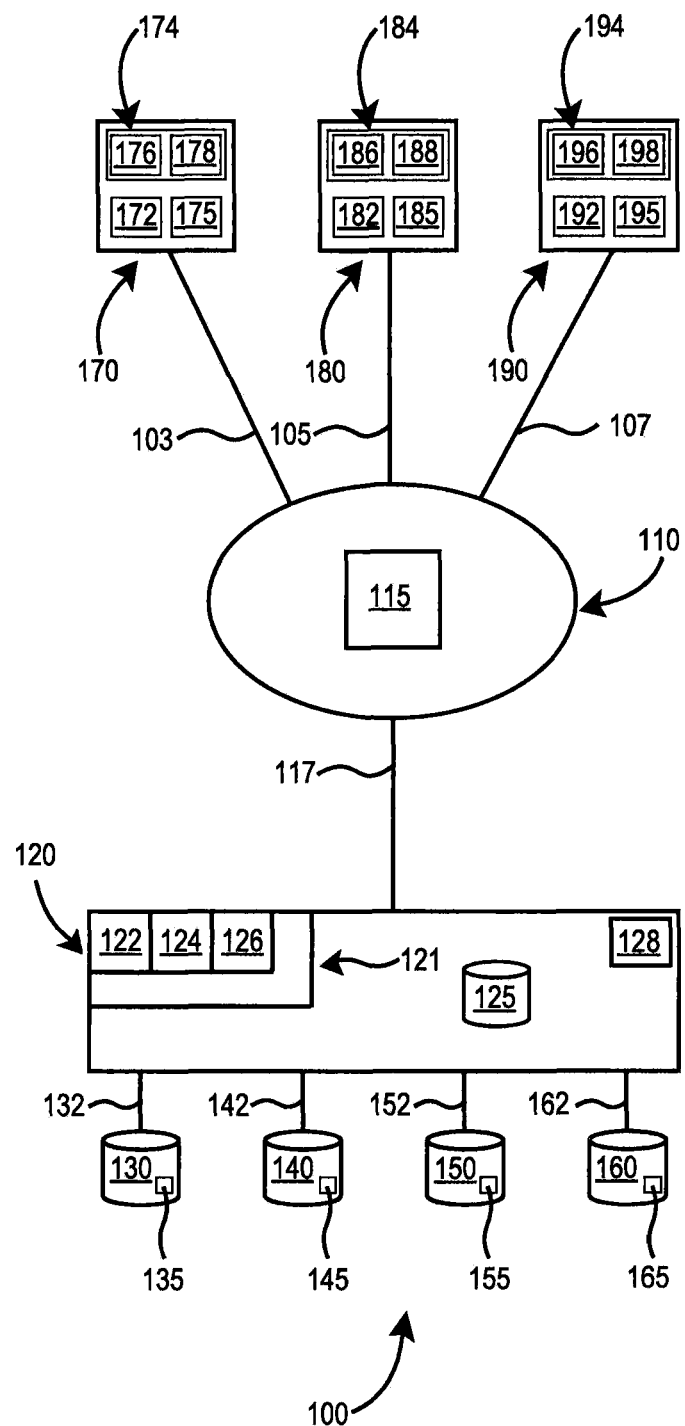
FIG. 1 is a block diagram showing one embodiment of a data storage system according to the present discussion.

In the illustrated embodiment of FIG. 1, data storage system 100 comprises storage controller 120 and data storage media 130, 140, 150, and 160. In the illustrated embodiment of FIG. 1, storage controller 120 communicates with data storage media 130, 140, 150, and 160, via I/O protocols 132, 142, 152, and 162, respectively. I/O protocols 132, 142, 152, and 162, may comprise any sort of I/O protocol, including without limitation a fibre channel loop, SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

By "data storage medium," Applicants mean a data storage medium in combination with the hardware, firmware, and/or software, needed to write information to, and read information from, that data storage medium. In certain embodiments, the data storage medium comprises a magnetic data storage medium, such as and without limitation a magnetic disk, magnetic tape, and the like. In certain embodiments, the data storage medium comprises an optical data storage medium, such as and without limitation a CD, DVD (Digital Versatile Disk), HD-DVD (High Definition DVD), BD (Blue-Ray Disk) and the like. In certain embodiments, the data storage medium comprises an electronic data storage medium, such as and without limitation a PROM, EPROM, EEPROM, Flash PROM, compactflash, smartmedia, and the like. In certain embodiments, the data storage medium comprises a holographic data storage medium.

Further in the illustrated embodiment of FIG. 1, Applicants' storage controller 120 is in communication with host computers 170, 180, and 190. As a general matter, host computers 170, 180, and 190, each comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, one or more of host computers 170, 180, and/or 190, further includes a storage management module 172, 182, 192, respectively. In certain embodiments, storage management modules 172, 182, and 192, may include the functionality of storage management type programs known in the art that manage the transfer of data to and from a data storage and retrieval system, such as for example and without limitation the IBM DFSMS implemented in the IBM MVS operating system.

Storage management modules 172, 182, and 192 may be implemented as a hardware circuit comprising custom VLSI circuits or gate arrays, off-the-shelf semiconductors such as logic chips, transistors, or other discrete components. Storage management modules 172, 182, and 192 may also be implemented in programmable hardware devices such as field programmable gate arrays, programmable array logic, programmable logic devices, or the like.

Storage management modules 172, 182, and 192 may also be implemented in software for execution by various types of processors. An identified module of executable code may, for instance, comprise one or more physical or logical blocks of computer instructions which may, for instance, be organized as an object, procedure, or function. Nevertheless, the executables of an identified storage management module need not be physically collocated, but may comprise disparate instructions stored in different locations which, when joined logically together, comprise the module and achieve the stated purpose for the module Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In the illustrated embodiment of FIG. 1, storage controller 120 comprises processor 128, computer readable medium 121, microcode 122 written to computer readable medium 121, and instructions 124 written to computer readable medium 121. Processor 128 utilizes microcode 122 to operate storage controller 120.

In the illustrated embodiment of FIG. 1, host computers 170, 180, and 190, are connected to fabric 110 utilizing I/O protocols 103, 105, and 107, respectively. I/O protocols 103, 105, and 107, may be any type of I/O protocol; for example, a Fibre Channel ("FC") loop, a direct attachment to fabric 110 or one or more signal lines used by host computers 170, 180, and 190, to transfer information to and from fabric 110.

In certain embodiments, fabric 110 includes, for example, one or more FC switches 115. In certain embodiments, those one or more switches 115 comprise one or more conventional router switches. In the illustrated embodiment of FIG. 1, one or more switches 115 interconnect host computers 170, 180, and 190, to storage controller 120 via I/O protocol 117. I/O protocol 117 may comprise any type of I/O interface, for example, a Fibre Channel, Infiniband, Gigabit Ethernet, Ethernet, TCP/IP, iSCSI, SCSI I/O interface or one or more signal lines used by FC switch 115 to transfer information through to and from storage controller 120, and subsequently data storage media 130, 140, 150, and 160. In other embodiments, one or more host computers, such as for example and without limitation host computers 170, 180, and 190, communicate directly with storage controller 120 using I/O protocols 103, 105, and 107, respectively.

Storage management modules 172, 182, and 192, are utilized to store and delete data sets on a data storage medium. This process of storing and deleting data sets can cause a data storage medium to become fragmented, reducing the overall storage capacity and performance of the system and increasing the frequency with which the data storage medium must be defragmented. To minimize fragmentation, Applicants' method selects an optimal data storage medium for data set encoding based upon an actual fragmentation index of each data storage medium, and based upon the size of the data set. In certain embodiments, Applicants' method writes large data sets to data storage media with little to no fragmentation. In certain embodiments, Applicants' method writes small data sets to data storage media comprising greater fragmentation. In certain embodiments, Applicants' method automatically defragments a data storage medium based upon the data storage medium's actual fragmentation index and a threshold fragmentation index.

Figure 2:
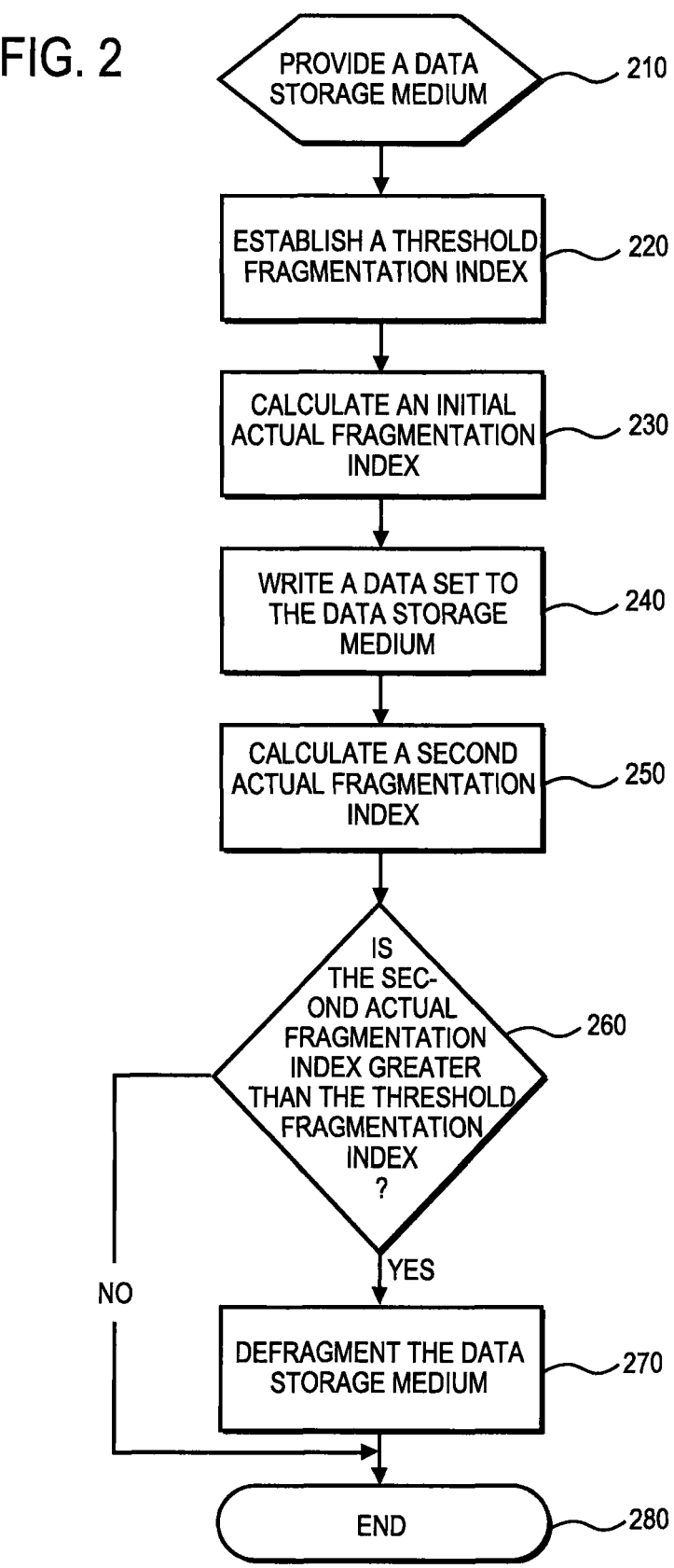
FIG. 2 presents a flow chart summarizing an exemplary embodiment of Applicants' method to identify whether a data storage medium should be defragmented.

FIG. 2 comprises a flowchart summarizing Applicants' method to determine whether a data storage medium should be defragmented. Referring now to FIG. 2, in step 210 the method provides a data storage medium, such as for example and without limitation data storage medium 130 (FIG. 1), and/or 140 (FIG. 1), and/or 150 (FIG. 1), and or 160 (FIG. 1).

In step 220, the method establishes a threshold fragmentation index, such as threshold fragmentation index 126 (FIG. 1) encoded in computer readable medium 121 (FIG. 1), threshold fragmentation index 176 (FIG. 1) encoded in computer readable medium 174 (FIG. 1), threshold fragmentation index 186 (FIG. 1) encoded in computer readable medium 184 (FIG. 1), and/or threshold fragmentation index 196 (FIG. 1) encoded in computer readable medium 194 (FIG. 1).

In certain embodiments, Applicants' fragmentation index comprises a numerical value derived from a number of files encoded on a data storage medium as separate fragments. In certain embodiments, Applicants' fragmentation index comprises a numerical value derived from a number of data set fragments encoded on a data storage medium.

By way of example and not limitation, a data storage medium may comprise four (4) data sets encoded therein, where a first data set having a size equal to 15% of the storage capacity of the data storage medium is separated into three fragments, a second data set having a size of 10% is separated into two fragments, a third data set having a size of 25% is separated into five fragments, and a fourth data set having a size of about 5% of the storage medium, is not fragmented.

In one embodiment, Applicants' method calculates a fragmentation index using the number of files that are fragmented, thereby resulting in a fragmentation index of three (3). In another embodiment, Applicants' method calculates a fragmentation index based upon a number of fragments stored on the data storage medium (fragmentation index=10). In yet another embodiment, Applicants' method calculates a fragmentation index as a percentage of the files stored on the data storage medium that are fragmented (fragmentation index=0.75). In still another embodiments, Applicants' method calculates a fragmentation index based upon the average number of fragments per file (fragmentation index equals 3.33). In yet another method the fragmentation index represents the percentage of the data storage medium that is unfragmented (fragmentation index=0.5). In still another method the fragmentation index reflects the percentage of the used space on the data storage medium that is fragmented (fragmentation index=0.89). In each of these embodiments, a lower fragmentation index is optimal.

In certain embodiments, Applicants' method calculates a fragmentation index based upon a percentage of unfragmented data sets (fragmentation index=0.25). In this embodiment, a higher fragmentation index is optimal.

In certain embodiments, the threshold fragmentation index of step 220 is established by a data set owner, such as the owner of a host computer 170, 180, and/or 190. In certain embodiments, the threshold fragmentation index of step 220 is established by an operator and/or operator of a storage controller, such as storage controller 120.

In step 230, the method calculates an actual fragmentation index for a data storage medium, such as data storage medium 174 (FIG. 1), 184 (FIG. 1), 194, (FIG. 1) 130 (FIG. 1), 140 (FIG. 1), 150 (FIG. 1), and/or 160 (FIG. 1). In certain embodiments, step 230 is performed by a host computer, such as one or more of host computers 170 (FIG. 1), 180 (FIG. 1), and/or 190 (FIG. 1). In certain embodiments, step 230 is performed by a storage management module, such as storage management module 172 (FIG. 1), 182 (FIG. 1), and/or 192 (FIG. 1). In certain embodiments, step 230 is performed by a storage controller, such as storage controller 120 (FIG. 1).

In step 240, a data set, such as and without limitation data set 135 (FIG. 1), 145 (FIG. 1), 155 (FIG. 1), and/or 165 (FIG. 1), is written to the data storage medium of step 210. In certain embodiments, step 240 is performed by a host computer, such as one or more of host computers 170 (FIG. 1), 180 (FIG. 1), and/or 190 (FIG. 1). In certain embodiments, step 240 is performed by a storage management module, such as storage management module 172 (FIG. 1), 182 (FIG. 1), and/or 192 (FIG. 1). In certain embodiments, step 240 is performed by a storage controller, such as storage controller 120 (FIG. 1).

In step 250, the method determines a second actual fragmentation index for the data storage medium of step 210. In certain embodiments, step 250 is performed by a host computer, such as one or more of host computers 170 (FIG. 1), 180 (FIG. 1), and/or 190 (FIG. 1). In certain embodiments, step 250 is performed by a storage management module, such as storage management module 172 (FIG. 1), 182 (FIG. 1), and/or 192 (FIG. 1). In certain embodiments, step 250 is performed by a storage controller, such as storage controller 120 (FIG. 1).

In step 260, in embodiments wherein a lower threshold index is optimal, the method determines if the second actual fragmentation index of step 250 is greater than the threshold fragmentation index of step 220. FIG. 2 at step 260 illustrates this embodiment. As described hereinabove, in other embodiments a higher fragmentation index is better than a lower fragmentation index. In these embodiments, in step 260 the method determines if the second actual fragmentation index of step 260 is less than the threshold fragmentation index of step 220.

In certain embodiments, step 260 is performed by a host computer, such as one or more of host computers 170 (FIG. 1), 180 (FIG. 1), and/or 190 (FIG. 1). In certain embodiments, step 260 is performed by a storage management module, such as storage management module 172 (FIG. 1), 182 (FIG. 1), and/or 192 (FIG. 1). In certain embodiments, step 260 is performed by a storage controller, such as storage controller 120 (FIG. 1).

If the method determines in step 260 that the second actual fragmentation index is greater (or lower as appropriate) than the threshold fragmentation index of step 220, the method transitions from step 260 to step 280 and ends.

Alternatively, if the method determines in step 260 that the second actual fragmentation index is not greater (or not lower as appropriate) than the threshold fragmentation index of step 220, the method transitions from step 260 to step 270 wherein the method defragments the data storage medium. In certain embodiments, step 270 is performed by a host computer, such as one or more of host computers 170 (FIG. 1), 180 (FIG. 1), and/or 190 (FIG. 1). In certain embodiments, step 270 is performed by a storage management module, such as storage management module 172 (FIG. 1), 182 (FIG. 1), and/or 192 (FIG. 1). In certain embodiments, step 270 is performed by a storage controller, such as storage controller 120 (FIG. 1).

By defragmenting the data storage medium, Applicants mean transforming the data storage medium by physically rearranging the data stored thereon such that the segments of fragmented data sets are stored contiguously resulting in an increased storage capacity, and decreased access and read times.

Figure 3:
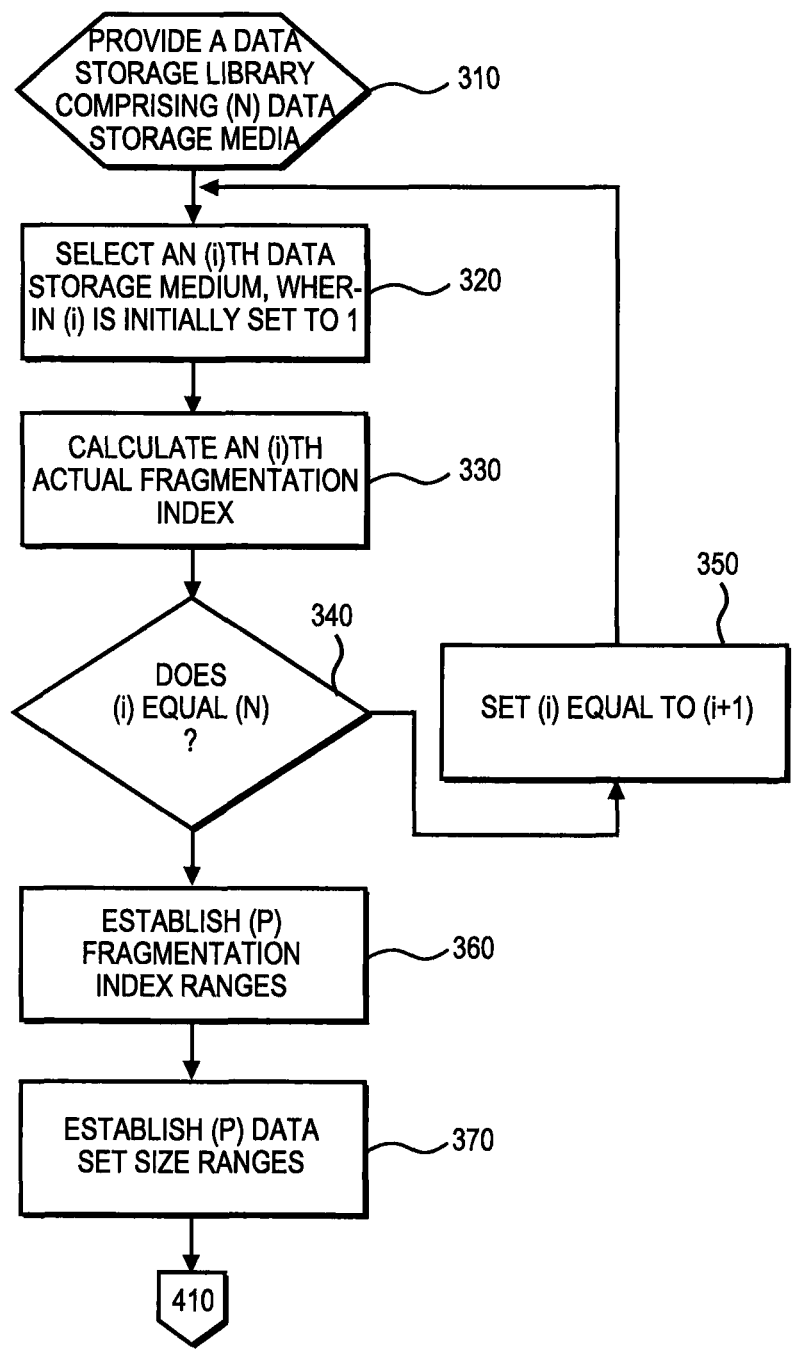
FIG. 3 is a flowchart summarizing certain initial steps of an exemplary embodiment of Applicants' method to identify an optimal data storage medium for storage of a data set based upon an actual fragmentation index of the data storage medium and the size of the data set.

Upon receiving a data set for storage, Applicants' method identifies an optimal data storage medium for storage of that newly-received data set. FIG. 3 summarizes the initial steps of Applicants' method. Referring now to FIG. 3, in step 310 the method provides a data storage system, such as data storage system 100 (FIG. 1), comprising (N) data storage media on which a data set may be stored, wherein (N) is greater than or equal to 1. In certain embodiments, (N) is greater than or equal to 8.

In step 320, the method selects an (i)th data storage medium, wherein (i) is initially set to 1. In certain embodiments, step 320 is performed by a host computer, such as one or more of host computers 170 (FIG. 1), 180 (FIG. 1), and/or 190 (FIG. 1). In certain embodiments, step 320 is performed by a storage management module, such as storage management module 172 (FIG. 1), 182 (FIG. 1), and/or 192 (FIG. 1). In certain embodiments, step 320 is performed by a storage controller, such as storage controller 120 (FIG. 1).

In step 330, the method determines and saves an (i)th actual fragmentation index for the (i)th data storage medium of step 320. In certain embodiments, the (i)th actual fragmentation index is encoded in a computer readable medium, such as computer readable media 174 (FIG. 1), 184 (FIG. 1), and/or 194 (FIG. 1), disposed in a host computer. In certain embodiments, the (i)th actual fragmentation index is encoded in a data storage medium in communication with a storage controller, such as one or more of data storage media 130 (FIG. 1), 140 (FIG. 1), 150 (FIG. 1), and/or 160 (FIG. 1).

In certain embodiments, step 330 is performed by a host computer, such as one or more of host computers 170 (FIG. 1), 180 (FIG. 1), and/or 190 (FIG. 1). In certain embodiments, step 330 is performed by a storage management module, such as storage management module 172 (FIG. 1), 182 (FIG. 1), and/or 192 (FIG. 1). In certain embodiments, step 330 is performed by a storage controller, such as storage controller 120 (FIG. 1).

In step 340, the method determines if an actual fragmentation index has been determined for each of the (N) data storage media of step 310, i.e. if (i) equals (N). In certain embodiments, step 340 is performed by a host computer, such as one or more of host computers 170 (FIG. 1), 180 (FIG. 1), and/or 190 (FIG. 1). In certain embodiments, step 340 is performed by a storage management module, such as storage management module 172 (FIG. 1), 182 (FIG. 1), and/or 192 (FIG. 1). In certain embodiments, step 340 is performed by a storage controller, such as storage controller 120 (FIG. 1).

If the method determines in step 340 that (i) does not equal (N), then the method transitions from step 340 to step 350 wherein the method sets (i) equal to (i+1). The method transitions from step 350 to step 320, and continues as described herein.

If the method determines in step 340 that (i) equals (N), then the method transitions from step 340 to step 360 wherein the method establishes (P) fragmentation index ranges, wherein (P) is greater than or equal to 2. In certain embodiments, (P) equals 3. In certain embodiments, (P) equals 5. In certain embodiments, (P) equals 10.

The (P) fragmentation index ranges, in combination, include all (N) actual fragmentation indices calculated in each iteration of step 330.

In certain embodiments, step 360 is performed by an owner of the data storage medium. In certain embodiments, step 360 is performed by an owner and/or operator of a storage controller, such as storage controller 120. In certain embodiments, step 360 is performed by a host computer, such as one or more of host computers 170 (FIG. 1), 180 (FIG. 1), and/or 190 (FIG. 1). In certain embodiments, step 360 is performed by a storage management module, such as storage management module 172 (FIG. 1), 182 (FIG. 1), and/or 192 (FIG. 1). In certain embodiments, step 360 is performed by a storage controller, such as storage controller 120 (FIG. 1).

In step 370, the method establishes (P) data set size ranges, wherein as described hereinabove (P) is greater than or equal to 2. The (P) data set size ranges, in combination, include all data set sizes likely to be generated by host computers 170, 180, and 190.

In certain embodiments, step 370 is performed by an owner of the data storage medium. In certain embodiments, step 370 is performed by an owner and/or operator of a storage controller, such as storage controller 120. In certain embodiments, step 370 is performed by a host computer, such as one or more of host computers 170 (FIG. 1), 180 (FIG. 1), and/or 190 (FIG. 1). In certain embodiments, step 370 is performed by a storage management module, such as storage management module 172 (FIG. 1), 182 (FIG. 1), and/or 192 (FIG. 1). In certain embodiments, step 370 is performed by a storage controller, such as storage controller 120 (FIG. 1).

In step 360, the method creates a plurality of fragmentation index ranges, and in step 370 the method establishes a corresponding plurality of data set size ranges. Applicants' method maximizes the likelihood that a data set is stored contiguously by reserving the least fragmented data storage media for the largest data sets, and storing smaller data sets on more fragmented storage media having less contiguous storage space available.

Figure 4:
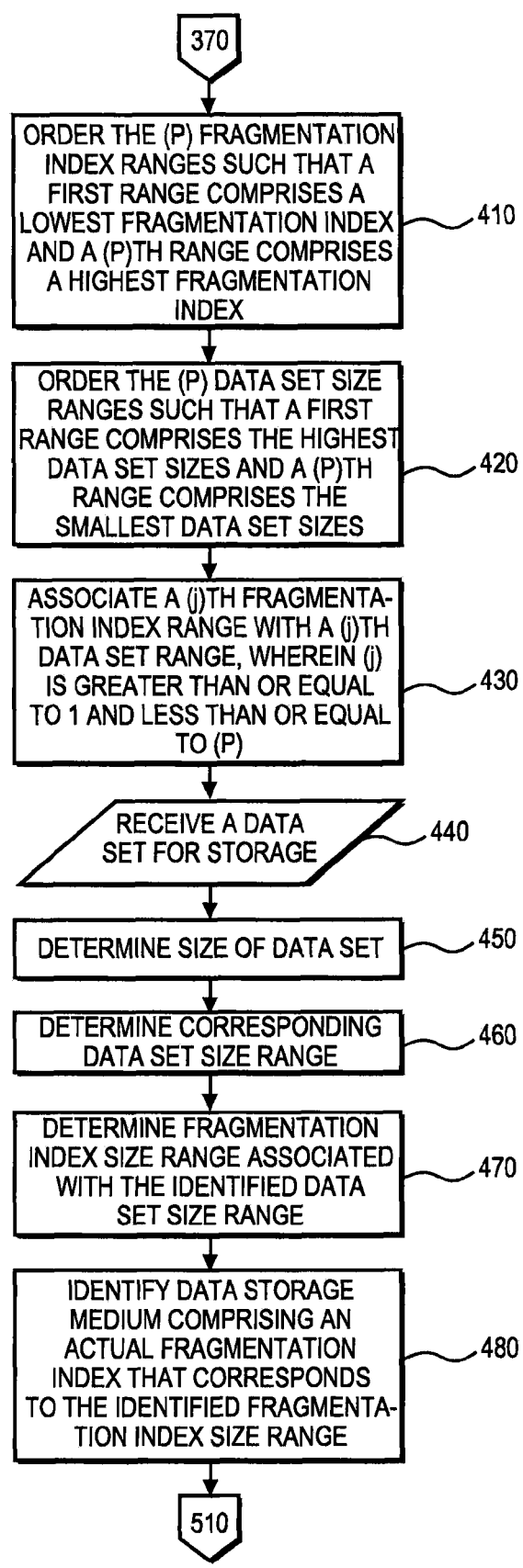
FIG. 4 is a flowchart summarizing certain additional steps of Applicants' method of FIG. 3.

Referring now to FIG. 4, in step 410 the method orders the (P) fragmentation index ranges of step 360 in ascending order. By "ascending order" Applicants mean that a first range comprises a lowest actual fragmentation index and such that a (P)th range comprises a highest actual fragmentation index. In certain embodiments, step 410 is performed by a host computer, such as one or more of host computers 170 (FIG. 1), 180 (FIG. 1), and/or 190 (FIG. 1). In certain embodiments, step 410 is performed by a storage management module, such as storage management module 172 (FIG. 1), 182 (FIG. 1), and/or 192 (FIG. 1). In certain embodiments, step 410 is performed by a storage controller, such as storage controller 120 (FIG. 1).

In step 420, the method orders the (P) data set size ranges in descending order. By "descending order" Applicant mean that a first data set size range comprises the largest data set sizes likely to be generated by host computers 170, 180, and/or 190, and a (P)th data set range comprises the smallest data set sizes likely to be generated by host computers 170, 180, and/or 190. In certain embodiments, step 420 is performed by a host computer, such as one or more of host computers 170 (FIG. 1), 180 (FIG. 1), and/or 190 (FIG. 1). In certain embodiments, step 420 is performed by a storage management module, such as storage management module 172 (FIG. 1), 182 (FIG. 1), and/or 192 (FIG. 1). In certain embodiments, step 420 is performed by a storage controller, such as storage controller 120 (FIG. 1).

In step 430, the method associates an (j)th fragmentation index range with an (j)th data set size range, wherein (j) is greater than or equal to 1 and less than or equal to (P). For example, in step 430 the method associates a first fragmentation index range which includes the smallest fragmentation indices calculated in the combined iterations of step 330 (FIG. 3), with a first data set size range which includes the largest data set sizes likely to be generated by host computers 170 (FIG. 1), 180 (FIG. 1), and 190 (FIG. 1). As a further example, in step 430 the method associates a (P)th fragmentation index range which includes data storage media comprising the largest fragmentation index, i.e. the data storage media comprising the largest number of data set fragments, with a (P)th data set size range which includes the smallest data set sizes likely to be generated by host computers 170, 180, and 190.

In step 440, the method provides a data set to storage controller 120 for storage in data storage media 130, 140, 150, and/or 160. In certain embodiments, the data set of step 440 is generated by one or more of host computers 170, 180, and/or 190.

In step 450, the method determines the size of the data set of step 450. In certain embodiments, step 450 is performed by a host computer, such as one or more of host computers 170 (FIG. 1), 180 (FIG. 1), and/or 190 (FIG. 1). In certain embodiments, step 450 is performed by a storage management module, such as storage management module 172 (FIG. 1), 182 (FIG. 1), and/or 192 (FIG. 1). In certain embodiments, step 450 is performed by a storage controller, such as storage controller 120 (FIG. 1).

In step 460, the method determines a data set size range that includes the data set size of step 450. In certain embodiments, step 460 is performed by a host computer, such as one or more of host computers 170 (FIG. 1), 180 (FIG. 1), and/or 190 (FIG. 1). In certain embodiments, step 460 is performed by a storage management module, such as storage management module 172 (FIG. 1), 182 (FIG. 1), and/or 192 (FIG. 1). In certain embodiments, step 460 is performed by a storage controller, such as storage controller 120 (FIG. 1).

In step 470, the method identifies a fragmentation index range associated in step 430 with the data set size range identified in step 460. In certain embodiments, step 470 is performed by a host computer, such as one or more of host computers 170 (FIG. 1), 180 (FIG. 1), and/or 190 (FIG. 1). In certain embodiments, step 470 is performed by a storage management module, such as storage management module 172 (FIG. 1), 182 (FIG. 1), and/or 192 (FIG. 1). In certain embodiments, step 470 is performed by a storage controller, such as storage controller 120 (FIG. 1).

In step 480, the method identifies a data storage medium comprising an actual fragmentation index that falls within the fragmentation index range identified in step 470. In certain embodiments, step 480 is performed by a host computer, such as one or more of host computers 170 (FIG. 1), 180 (FIG. 1), and/or 190 (FIG. 1). In certain embodiments, step 480 is performed by a storage management module, such as storage management module 172 (FIG. 1), 182 (FIG. 1), and/or 192 (FIG. 1). In certain embodiments, step 480 is performed by a storage controller, such as storage controller 120 (FIG. 1).

Figure 5:
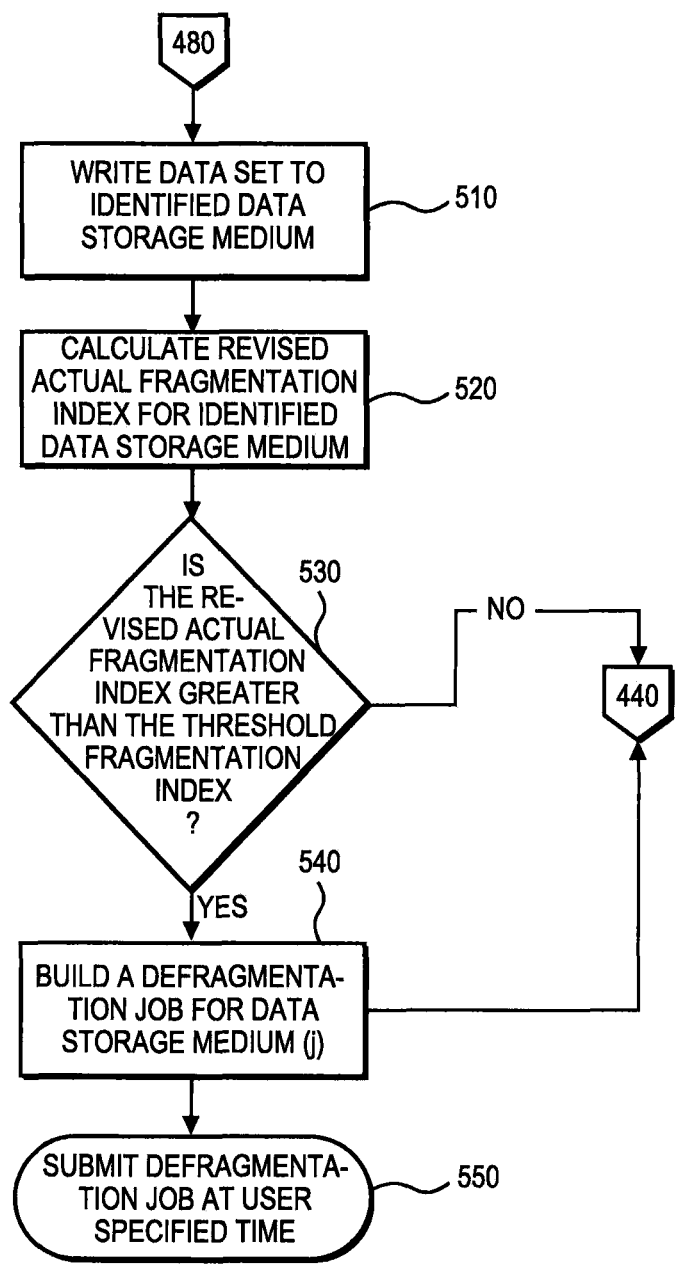
FIG. 5 is a flowchart summarizing certain additional steps of Applicants' method of FIG. 3.

Referring now to FIG. 5, in step 510 the method writes the data set of step 440 to the data storage medium identified in step 480. In certain embodiments, step 510 is performed by a host computer, such as one or more of host computers 170 (FIG. 1), 180 (FIG. 1), and/or 190 (FIG. 1). In certain embodiments, step 510 is performed by a storage management module, such as storage management module 172 (FIG. 1), 182 (FIG. 1), and/or 192 (FIG. 1). In certain embodiments, step 510 is performed by a storage controller, such as storage controller 120 (FIG. 1).

In step 520, the method calculates a revised actual fragmentation index for the data storage medium of step 510. In certain embodiments, step 520 is performed by a host computer, such as one or more of host computers 170 (FIG. 1), 180 (FIG. 1), and/or 190 (FIG. 1). In certain embodiments, step 520 is performed by a storage management module, such as storage management module 172 (FIG. 1), 182 (FIG. 1), and/or 192 (FIG. 1). In certain embodiments, step 520 is performed by a storage controller, such as storage controller 120 (FIG. 1).

In step 530, the method determines if the revised actual fragmentation index of step 520 is greater than (or less than as appropriate for the particular fragmentation index used) the threshold fragmentation index of step 220 (FIG. 2). In certain embodiments, step 530 is performed by a host computer, such as one or more of host computers 170 (FIG. 1), 180 (FIG. 1), and/or 190 (FIG. 1). In certain embodiments, step 530 is performed by a storage management module, such as storage management module 172 (FIG. 1), 182 (FIG. 1), and/or 192 (FIG. 1). In certain embodiments, step 530 is performed by a storage controller, such as storage controller 120 (FIG. 1).

If the method determines in step 530 that the revised actual fragmentation index of step 520 is not greater than (or not less than as appropriate for the particular fragmentation index used) the threshold fragmentation index of step 220, then the method transitions from step 530 to step 440 and pauses to receive a data set for storage. Alternatively, if the method determines in step 530 that the revised actual fragmentation index of step 520 is greater than (or less than as appropriate for the particular fragmentation index used) the threshold fragmentation index of step 220, then the method transitions from step 530 to step 540 wherein the method builds and stores a defragmentation job for the data storage medium of step 510. The method transitions to step 550 and to step 440 wherein the method pauses to receive another data set for storage.

In certain embodiments, the defragmentation job of step 540 is stored in a computer readable medium, such as one or more of computer readable media 174 (FIG. 1), 184 (FIG. 1), and/or 194 (FIG. 1), disposed in a host computer. In certain embodiments, the defragmentation job of step 540 is stored in a computer readable medium disposed in a storage controller, such as DASD 125 (FIG. 1). In certain embodiments, the defragmentation job of step 540 is stored in a computer readable medium in communication with a storage controller, such as one or more of data storage media 130 (FIG. 1), 140 (FIG. 1), 150 (FIG. 1), and/or 160 (FIG. 1).

In step 550, the method submits the defragmentation job of step 540 to a processor at a user specified time.

In certain embodiments, individual steps described in connection with FIGS. 2, 3, 4, and/or 5, may be combined, eliminated, or reordered.

In certain embodiments, instructions, such as instructions 178, 188, 198, and/or 124, are encoded in computer readable medium, such as computer readable media 174, 184, 194, and/or 121, respectively, wherein those instructions are executed by a processor, such as processor 175, 185, 195, and/or 128, respectively, to perform one or more of the steps 220, 230, 240, 250, 260, 270, and/or 280, recited in FIG. 2, and/or one or more of steps 310, 320, 330, 340, 350, 360, and/or 370, recited in FIG. 3, and/or one or more of steps 410, 420, 430, 440, 450, 460, 470, and/or 480, recited in FIG. 4, and/or one or more of steps 510, 520, 530, 540, and/or 550, recited in FIG. 5.

In yet other embodiments, the invention includes instructions residing in any other computer program product, where those instructions are executed by a computer external to, or internal to, a computing system to perform one or more of the blocks 220, 230, 240, 250, 260, 270, and/or 280, recited in FIG. 2, and/or one or more of steps 310, 320, 330, 340, 350, 360, and/or 370, recited in FIG. 3, and/or one or more of steps 410, 420, 430, 440, 450, 460, 470, and/or 480, recited in FIG. 4, and/or one or more of steps 510, 520, 530, 540, and/or 550, recited in FIG. 5. In either case the instructions may be encoded in a computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present inventions.

We claim:

1. A method for minimizing data storage media fragmentation, comprising:
    decoding, by a server hardware computing device coupled to a network and comprising at least one processor executing specific computer-executable instructions within a storage management module stored within a memory:
        a first data set encoding a first plurality of data of a first data set size; and
        a second data set encoding a second plurality of data of a second data set size less than the first data set size;
    calculating, by said server hardware computing device, for each of a plurality of data storage media devices coupled to said network, an actual fragmentation index defining an amount of actual fragmentation according to a total number, a percentage, or an average number of fragmented or non-fragmented files, fragments, fragments per file, used fragmented space, or non-fragmented space on each of said plurality of data storage media devices;
    receiving, by said server hardware computing device, a user input encoding:
        a threshold fragmentation index for;
        a plurality of fragmentation index ranges, each of said plurality of fragmentation index ranges including an amount of actual fragmentation for one of said plurality of data storage media devices; and
        a plurality of data set size ranges, wherein a first data set range includes the first data set size, and a second data set range includes the second data set size;
    associating, by said server hardware computing device
        the first data set range with a first fragmentation index range, in the plurality of fragmentation index ranges, with a lowest fragmentation index; and
        the second data set range with a second fragmentation index range, in the plurality of fragmentation index ranges, with a greater fragmentation index range than the first fragmentation index range; and
    writing, by said server hardware computing device:
        the first data set to a first identified data storage media device with the actual fragmentation index in the first fragmentation index range; and
        the second data set to a second identified data storage media device with the actual fragmentation index in the second fragmentation index range; and
    responsive to a determination that the actual fragmentation index of the first identified data storage media device or the second identified data storage media device is beyond the threshold fragmentation index, submitting, by said server hardware computing device, to the at least one processor, a defragmentation job to defragment the first identified data storage media device or the second identified data storage media device.

2. The method of claim 1, wherein an (i)th actual fragmentation index is based upon a number of fragmented data sets encoded in an (i)th data storage medium.

3. The method of claim 1, wherein an (i)th actual fragmentation index is based upon a number of non-fragmented data sets encoded in an (i)th data storage medium.

4. The method of claim 1, further comprising:
    determining the first data set size for the first data set and the second data set size for the second data set; and
    selecting an (i)th data storage media based upon an (i)th actual fragmentation index and said first data set size or said second data set size.

5. The method of claim 4, further comprising:
    establishing (P) fragmentation index ranges, wherein (P) is greater than or equal to 2;
    establishing (P) data set size ranges;
    arranging said (P) fragmentation index ranges in ascending order;
    arranging said (P) data set size ranges in descending order;
    associating a (j)th fragmentation index range with a (j)th data set size range, wherein (j) is greater than or equal to 1 and less than or equal to (P).

6. The method of claim 5, further comprising:
    identifying a data set size range;
    identifying a fragmentation index range associated with said identified data set size range;
    selecting a data storage medium comprising an actual fragmentation index falling within said identified fragmentation index range;
    encoding said data set in said selected data storage medium.

7. The method of claim 6, further comprising:
    determining a revised actual fragmentation index for said selected data storage medium;
    determining if said revised actual fragmentation index is greater than said threshold fragmentation index;

operative if said second actual fragmentation index is greater than said threshold fragmentation index, building a defragmentation job which includes said selected data storage medium;
submitting the defragmentation job to a processor at a user specified time.

8. A system, comprising a data storage library external to and in communication with a server hardware computing device coupled to a network and comprising at least one processor executing specific computer-executable instructions within a storage management module stored within a memory, that, when executed, cause the system to:
decode:
a first data set encoding a first plurality of data of a first data set size; and
a second data set encoding a second plurality of data of a second data set size less than the first data set size;
calculate, for each of a plurality of data storage media devices coupled to the network, defining an amount of actual fragmentation according to a total number, a percentage, or an average number of fragmented or non-fragmented files, fragments, fragments per file, used fragmented space, or non-fragmented space on each of said plurality of data storage media devices;
receive a user input encoding
a threshold fragmentation index;
a plurality of fragmentation index ranges, each of said plurality of fragmentation index ranges including an amount of actual fragmentation for one of said plurality of data storage media devices; and
a plurality of data set size ranges, wherein a first data set range includes the first data set size, and a second data set range includes the second data set size
associate:
the first data set range with a first fragmentation index range, in the plurality of fragmentation index ranges, with a lowest fragmentation index; and
the second data set range with a second fragmentation index range, in the plurality of fragmentation index ranges, with a greater fragmentation index range than the first fragmentation index range; and
write:
the first data set to a first identified data storage media device with the actual fragmentation index in the first fragmentation index range; and
the second data set to a second identified data storage media device with the actual fragmentation index in the second fragmentation index range; and
responsive to a determination that the actual fragmentation index of the first identified data storage media device or the second identified data storage media device is beyond the threshold fragmentation index, submit to the at least one processor, a defragmentation job to defragment the first identified data storage media device or the second identified data storage media device.

9. The system of claim 8, wherein an (i)th actual fragmentation index is based upon a number of non-fragmented data sets encoded in an (i)th data storage medium.

10. The system of claim 8, wherein an (i)th actual fragmentation index is based upon a number of fragmented data sets encoded in an (i)th data storage medium.

11. The system of claim 10, said computer-executable instructions further comprising a series of computer readable program steps to effect:
determining the first data set size for the first data set and the second data set size for the second data set; and
selecting an (i)th data storage media based upon an (i)th actual fragmentation index and said first data set size or said second data set size.

12. The system of claim 11, wherein said computer-executable instructions further comprise a series of computer readable program steps to effect:
establishing (P) fragmentation index ranges, wherein (P) is greater than or equal to 2;
establishing (P) data set size ranges;
arranging said (P) fragmentation index ranges in ascending order;
arranging said (P) data set size ranges in descending order;
associating a (j)th fragmentation index range with a (j)th data set size range, wherein (j) is greater than or equal to 1 and less than or equal to (P).

13. The system of claim 12, wherein said computer executable instructions further comprise a series of computer readable program steps to effect:
identifying a data set size range;
identifying a fragmentation index range associated with said identified data set size range;
selecting a data storage medium comprising an actual fragmentation index falling within said identified fragmentation index range;
encoding said data set in said selected data storage medium.

14. The system of claim 13, wherein said computer executable instructions further comprise a series of computer readable program steps to effect:
determining a revised actual fragmentation index for said selected data storage medium;
determining if said revised actual fragmentation index is greater than said threshold fragmentation index;
operative if said second actual fragmentation index is greater than said threshold fragmentation index, building a defragmentation job which includes said selected data storage medium;
submitting the defragmentation job to a processor at a user specified time.

15. A computer program product encoded in a computer readable medium disposed within a data storage library in communication with and external to a server hardware computing device coupled to a network and comprising at least one processor executing specific computer-executable instructions within a storage management module stored within a memory, the computer program product comprising computer readable program code which causes the at least one processor to:
decode:
a first data set encoding a first plurality of data of a first data set size; and
a second data set encoding a second plurality of data of a second data set size less than the first data set size;
calculate, for each of a plurality of data storage media devices coupled to said network, an actual fragmentation index defining an amount of actual fragmentation according to a total number, a percentage, or an average number of fragmented or non-fragmented files, fragments, fragments per file, used fragmented space, or non-fragmented space on each of said plurality of data storage media devices;
receive a user input encoding
a threshold fragmentation index;
a plurality of fragmentation index ranges, each of said plurality of fragmentation index ranges including an amount of actual fragmentation for one of said plurality of data storage media devices; and a plurality of data set size ranges, wherein a first data set range includes the first data set size, and a second data set range includes the second data set size;

associate:
the first data set range with a first fragmentation index range, in the plurality of fragmentation index ranges, with a lowest fragmentation index; and the second data set range with a second fragmentation index range, in the plurality of fragmentation index ranges, with a greater fragmentation index range than the first fragmentation index range; and write:
the first data set to a first identified data storage media device with the actual fragmentation index in the first fragmentation index range; and the second data set to a second identified data storage media device with the actual fragmentation index in the second fragmentation index range; and responsive to a determination that the actual fragmentation index of the first identified data storage media device or the second identified data storage media device is beyond the threshold fragmentation index, submit, to the at least one processor, a defragmentation job to defragment the first identified data storage media device or the second identified data storage media device.

16. The computer program product of claim 15, wherein an (i)th actual fragmentation index is based upon a number of fragmented data sets encoded in an (i)th data storage medium.

17. The computer program product of claim 16, further comprising:
computer readable program code which causes said at least one processor to determine the first data set size for the first data set and the second data set size for the second data set; and computer readable program code which causes said at least one processor to select an (i)th data storage media based upon an (i)th actual fragmentation index and said first data set size or said second data set size.

18. The computer program product of claim 17, further comprising:
computer readable program code which causes said at least one processor to establish (P) fragmentation index ranges, wherein (P) is greater than or equal to 2;

computer readable program code which causes said at least one processor to establish (P) data set size ranges;

computer readable program code which causes said at least one processor to arrange said (P) fragmentation index ranges in ascending order;

computer readable program code which causes said at least one processor to arrange said (P) data set size ranges in descending order;

computer readable program code which causes said at least one processor to associate a (j)th fragmentation index range with a (j)th data set size range, wherein (j) is greater than or equal to 1 and less than or equal to (P).

19. The computer program product of claim 18, further comprising:
computer readable program code which causes said at least one processor to identify a data set size range;

computer readable program code which causes said at least one processor to identify a fragmentation index range associated with said identified data set size range;

computer readable program code which causes said at least one processor to select a data storage medium comprising an actual fragmentation index falling within said identified fragmentation index range; and computer readable program code which causes said at least one processor to encode said data set in said selected data storage medium.

20. The computer program product of claim 19, further comprising:
computer readable program code which causes said at least one processor to determine a revised actual fragmentation index for said selected data storage medium;

computer readable program code which causes said at least one processor to determine if said revised actual fragmentation index is greater than said threshold fragmentation index;

computer readable program code which, if said second actual fragmentation index is greater than said threshold fragmentation index, causes said at least one processor to build a defragmentation job for the assigned data storage medium; and computer readable program code which causes said at least one processor to submit the defragmentation job to a processor at a user specified time.

* * * * *